(12) United States Patent
Yamanaka et al.

(10) Patent No.: US 8,754,176 B2
(45) Date of Patent: Jun. 17, 2014

(54) LOW MOLECULAR WEIGHT POLYTETRAFLUOROETHYLENE POWDER AND PREPARATION METHOD THEREFOR

(75) Inventors: Taku Yamanaka, Settsu (JP); Masayuki Tsuji, Settsu (JP); Shunji Kasai, Settsu (JP); Yasuhiko Sawada, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 47 days.

(21) Appl. No.: 13/260,911

(22) PCT Filed: Mar. 31, 2010

(86) PCT No.: PCT/JP2010/055891
§ 371 (c)(1),
(2), (4) Date: Sep. 28, 2011

(87) PCT Pub. No.: WO2010/114033
PCT Pub. Date: Oct. 7, 2010

(65) Prior Publication Data
US 2012/0101214 A1 Apr. 26, 2012

(30) Foreign Application Priority Data
Mar. 31, 2009 (JP) .................. 2009-088270

(51) Int. Cl.
*C08F 214/26* (2006.01)

(52) U.S. Cl.
USPC ............ 526/89; 525/199; 525/200; 525/255; 428/402

(58) Field of Classification Search
USPC ............ 526/89; 525/199, 200, 255; 428/402
See application file for complete search history.

(56) References Cited

U.S. PATENT DOCUMENTS

| | | | |
|---|---|---|---|
| 2,534,058 A | 12/1950 | Renfrew | |
| 3,838,030 A | 9/1974 | Kagiya et al. | |
| 4,711,949 A | 12/1987 | Aramaki et al. | |
| 4,774,304 A * | 9/1988 | Kuhls et al. | 526/247 |
| 4,914,158 A * | 4/1990 | Yoshimura et al. | 525/199 |
| 5,641,571 A | 6/1997 | Mayer et al. | |
| 7,176,265 B2 * | 2/2007 | Morgan | 526/89 |
| 7,494,758 B2 * | 2/2009 | Tsujino et al. | 430/137.15 |

| | | | |
|---|---|---|---|
| 2004/0014886 A1 | 1/2004 | Hintzer et al. | |
| 2005/0277045 A1 | 12/2005 | Saito et al. | |
| 2007/0282031 A1 | 12/2007 | Lehmann et al. | |
| 2010/0204345 A1 | 8/2010 | Yamanaka et al. | |

FOREIGN PATENT DOCUMENTS

| | | | |
|---|---|---|---|
| CN | 1284519 A | | 2/2001 |
| CN | 1478110 A | | 2/2004 |
| EP | 1605011 A1 | | 12/2005 |
| EP | 1964856 A1 | | 9/2008 |
| EP | 2415788 A1 | * | 2/2012 |
| JP | 48-78252 | | 10/1973 |
| JP | 51-41085 A | | 4/1976 |
| JP | 61-162503 A | | 7/1986 |
| JP | 7-165828 A | | 6/1995 |
| JP | 10-147617 | * | 6/1998 |
| JP | 10-147617 A | | 6/1998 |
| JP | 2001-049068 A | | 2/2001 |
| JP | 2001-049068 A | | 2/2001 |
| JP | 2004-514769 A | | 5/2004 |
| JP | 2005-002322 | * | 1/2005 |
| JP | 2005-2322 A | | 1/2005 |
| JP | 2006-63140 A | | 3/2006 |
| JP | 2006-509072 A | | 3/2006 |
| JP | 2007-510028 A | | 4/2007 |
| JP | 2009-001745 | * | 1/2009 |
| JP | 2009-1745 A | | 1/2009 |
| WO | 0244226 A1 | | 6/2002 |
| WO | 02088207 A1 | | 11/2002 |
| WO | WO-2004/050727 A1 | * | 6/2004 |
| WO | WO 2004050727 A1 | | 6/2004 |
| WO | 2009020187 A1 | | 2/2009 |

* cited by examiner

*Primary Examiner* — Peter D. Mulcahy
*Assistant Examiner* — Henry Hu
(74) *Attorney, Agent, or Firm* — Sughrue Mion, PLLC

(57) ABSTRACT

The present invention provides a low-molecular weight polytetrafluoroethylene powder that, when used as an additive in a coating material, etc., can form a coating with excellent texture and gliding properties, while also improving dispersibility and viscosity; and a production process therefor. The present invention is a process for producing a low-molecular weight polytetrafluoroethylene powder, the process comprising: an emulsion polymerization step of polymerizing at least tetrafluoroethylene in the presence of a polymerization initiator and an aqueous medium to produce emulsified particles thereof; an agglomeration step of agglomerating the emulsified particles to form an agglomerated powder thereof; and a suspension polymerization step of polymerizing at least tetrafluoroethylene in the presence of the agglomerated powder, a polymerization initiator, and an aqueous medium.

18 Claims, No Drawings

LOW MOLECULAR WEIGHT POLYTETRAFLUOROETHYLENE POWDER AND PREPARATION METHOD THEREFOR

CROSS REFERENCE TO RELATED APPLICATIONS

This application is a National Stage of International Application No. PCT/JP2010/055891 filed Mar. 31, 2010, claiming priority based on Japanese Patent Application No. 2009-088270 filed Mar. 31, 2009, the contents of all of which are incorporated herein by reference in their entirety.

TECHNICAL FIELD

The present invention relates to a low-molecular weight polytetrafluoroethylene powder and production method therefor.

BACKGROUND ART

Low-molecular weight polytetrafluoroethylene (PTFE) powder with a molecular weight of 600,000 or less (also called PTFE micropowder) not only has excellent chemical stability and extremely low surface energy, but particle fibrillation is also unlikely to occur therein. As a result, PTFE micropowder is used as an additive to enhance the gliding properties and texture of coated surfaces in plastics, inks, cosmetics, paint, grease, and the like (e.g., see Patent Document 1).

Examples of known methods for producing low-molecular weight PTFE include a method in which high-molecular weight PTFE is brought into contact with a specific fluoride and reacted under high temperature conditions to thermally degrade the same (e.g., see Patent Document 2) and a method in which a high-molecular weight PTFE powder or formed body is irradiated with an ionizing radiation (e.g., see Patent Document 3).

However, methods involving thermal degradation of high-molecular weight PTFE and methods involving the exposure of high-molecular weight PTFE to radiation are not always advantageous from the standpoint of equipment costs and convenience.

A process involving direct polymerization of the TFE monomer in the presence of a chain transfer agent is also known as a method for producing low-molecular weight PTFE. For example, Patent Document 4 proposes performing polymerization using a $C_{1-3}$ fluoroalkane or chlorofluoroalkane as a chain transfer agent (telogen).

As in the case of the method of Patent Document 4, it is not always clear which process is to be used as the industrial polymerization method, but such industrial methods can be roughly divided into suspension polymerization and emulsion polymerization.

In suspension polymerization a polymerization initiator is dispersed in an aqueous medium in the presence of a chain transfer agent using little or no surfactant, TFE is polymerized either with TFE or a monomer copolymerizable therewith, and a low-molecular weight PTFE granular powder is directly isolated from the reaction (e.g., see Patent Documents 5 and 6). In suspension polymerization the initially formed polymer is solidified at an early stage of polymerization by high-shear stirring, and polymerization continues to occur on the solid particles in a gas-solid reaction wherein the water functions mainly as a thermal conduction medium (e.g., see Patent Document 7). Little or no surfactant is used in suspension polymerization, and low-molecular weight PTFE powder can be obtained directly, but the particle size is difficult to control.

In contrast, in emulsion polymerization a fluorine-containing surfactant that functions as a polymerization initiator and emulsifying agent is dispersed in an aqueous medium in the presence of a chain transfer agent, and TFE is polymerized either with TFE or a monomer copolymerizable therewith to obtain low-molecular weight PTFE. Unlike suspension polymerization, because of the presence of the fluorine-containing surfactant, with emulsion polymerization an aqueous dispersion containing emulsified particles (also called micelles or primary particles) of 1 μm or smaller are obtained (e.g., see Patent Document 8). The resulting aqueous dispersion can either be used as is, or can be enriched and used in a water-based coating material, etc.

When the low-molecular weight PTFE obtained by emulsion polymerization is to be used as a powder, it can be coagulated from the above aqueous dispersion and made into powdered particles (micropowder).

Low-molecular weight PTFE powdered, particles obtained by emulsion polymerization have the following characteristics: the specific surface area is greater than those obtained by suspension polymerization at 7 to 20 $m^2/g$ (rarely, 5 to 20 $m^2/g$), and because the particles are soft, they are very effective for surface modification, e.g., improving the texture of a coated surface. Moreover, they have greater oil absorption, and a stable dispersion in a matrix material can be obtained thereby. In addition, low-molecular weight PTFE powdered particles obtained by emulsion polymerization are preferred because it is possible to control particle size by adjusting the conditions of the coagulation process noted above.

However, the cost is higher with the emulsion polymerization described above because a fluorine-containing surfactant or other expensive material must be used as an emulsifier. In addition, residual surfactant can cause discoloration, etc., of the PTFE particles.

As a result, a process for producing PTFE wherein polymerization is performed without the addition of these fluorine-containing surfactants is needed.

A TFE suspension polymerization process is known wherein the reaction is performed in an aqueous medium using TFE and a water-soluble peroxide (e.g., see Non-Patent Document 1) as a method of carrying out polymerization without the addition of a fluorine-containing surfactant. Patent Document 9 also discloses that TFE polymerization was performed in an aqueous medium without the addition of a surfactant by using disuccinic acid peroxide as the polymerization initiator, and an aqueous dispersion of PTFE was obtained thereby.

However, the aqueous dispersions disclosed in the examples of Patent Document 9 have a very dilute concentration of polymer solids at only 6.5 wt %, which is entirely impractical in terms of productivity. In addition, Patent Document 9 does not mention the addition of a chain transfer agent, and it discloses no data indicating the size and molecular weight of the resulting emulsified polymer particles.

Furthermore, a process has been disclosed wherein emulsion polymerization is carried out between TFE and either TFE or a monomer copolymerizable therewith in an aqueous medium using a chain transfer agent and a water-soluble peroxide as a method for performing polymerization without the addition of a fluorine-containing surfactant (e.g., see Patent Document 10).

Patent Document 1: Japanese Patent Application Laid-open No. H10-147617
Patent Document 2: Japanese Patent Application Laid-open Patent Document 3: Japanese Patent Application Laid-open No. S48-78252
Patent Document 4: Japanese Patent Application Laid-open No. S51-41085
Patent Document 5: WO 2004/050727
Patent Document 6: Japanese Patent Application Laid-open No. 2005-2322
Patent Document 7: Japanese Translation of PCT Application No. 2006-509072
Patent Document 8: Japanese Patent Application Laid-open No. H7-165828
Patent Document 9: U.S. Pat. No. 2,534,058
Patent Document 10: Japanese Patent Application Laid-open No. 2009-1745
Non-Patent Document 1: Takaomi Satogawa "Handbook of Fluoropolymers" The Nikkan Kogyo Shimbun, Ltd. (1990), page 27.

There was room for improvement, however, with polymers obtained by the kind of emulsion polymerization disclosed in Patent Documents 8 and 10 in properties such as dispersibility, viscosity, and the like when used as an additive in a coating material, etc. Moreover, there was room for improvement with polymers obtained by the kind of suspension polymerization disclosed in Patent Documents 5 to 7 in properties such as the appearance, transparency, texture, and the like of a coating film obtained thereby.

SUMMARY OF THE INVENTION

In light of the current state, the present invention provides a low-molecular weight polytetrafluoroethylene powder that, when used as an additive in a coating material, etc., can form a coating with excellent texture and gliding properties, while also improving dispersibility and viscosity; and a production process therefor.

The present invention is a process for producing a low-molecular weight polytetrafluoroethylene powder, the process comprising: an emulsion polymerization step of polymerizing at least tetrafluoroethylene in the presence of a polymerization initiator and an aqueous medium to produce emulsified particles thereof; an agglomeration step of agglomerating the emulsified particles to form an agglomerated powder thereof; and a suspension polymerization step of polymerizing at least tetrafluoroethylene in the presence of the agglomerated powder, a polymerization initiator, and an aqueous medium.

The present invention is also a low-molecular weight polytetrafluoroethylene powder obtained by the above process for producing a low-molecular weight polytetrafluoroethylene powder.

The present invention is also an additive comprising the above low-molecular weight polytetrafluoroethylene powder.

The present invention is also a composition comprising the above low-molecular weight polytetrafluoroethylene powder.

The present invention is described in greater detail below.

The present invention uses a combination of emulsion polymerization and suspension polymerization. The powder obtained by emulsion polymerization can be stably produced, can enhance texture and gliding properties of a coated surface when used as an additive in a coating material, etc., and easily forms a fine dispersion in a matrix material (counter material) due to its high oil absorption. Suspension polymerization does not require the kind of coagulation step used in emulsion polymerization, and a hard powder with excellent dispersibility can be obtained thereby.

The low-molecular weight polytetrafluoroethylene powder obtained by the production process of the present invention combines the respective merits of emulsion polymerization and suspension polymerization, and it can not only enhance the texture and gliding properties of a coated surface, but can also improve dispersibility and viscosity.

Preferably a chain transfer agent is present in at least one of the above emulsion polymerization step and suspension polymerization step in the production process of the present invention, and more preferably a chain transfer agent is present in both steps through the addition thereof in the emulsion polymerization step.

Adding the above chain transfer agent enables control of the molecular weight of the resulting low-molecular weight PTFE, and using the low-molecular weight PTFE as an additive in various types of counter materials can improve the dispersibility thereof.

The production process for the low-molecular weight polytetrafluoroethylene powder (hereinafter, also called "low-molecular weight PTFE powder") of the present invention preferably includes an addition step wherein at least tetrafluoroethylene (TFE), a chain transfer agent, a polymerization initiator, and an aqueous medium are added to a reaction vessel.

In the production process of the present invention both a chain transfer agent and a water-soluble peroxide polymerization initiator are used together, and emulsion polymerization of the TFE is carried out either by self-emulsion or by the use of a surfactant.

In other words, in the production process of the present invention, preferably the polymerization initiator is a water-soluble peroxide and/or the above emulsion polymerization step is a step wherein polymerization is carried out in the presence of a surfactant.

The TFE, chain transfer agent, polymerization initiator, and aqueous medium added to the reaction vessel can be added to the reaction vessel at least before the emulsion polymerization step, and the order of addition is not particularly limited herein, but the emulsion polymerization step is normally initiated by adding the polymerization initiator.

Preferably the above chain transfer agent is at least one type of compound selected from a group consisting of hydrogen, lower saturated hydrocarbons, lower halogenated hydrocarbons, and lower alcohols.

Preferably the above lower saturated hydrocarbon is methane, ethane, propane, butane, hexane, cyclohexane, or another $C_{1-6}$ straight chain, branched, or cyclic alkane.

Preferably the above lower halogenated hydrocarbon is $CH_3Cl$, $CH_2Cl_2$, $CH_2CF_2$, $CHCF_3$, etc.

Preferably the above lower alcohol is methanol, ethanol, or another $C_{1-3}$ alcohol.

More preferably, from the standpoint of chain transfer capability, the above chain transfer agent is ethane or propane.

The above chain transfer agent can be added to the reaction vessel all at once before starting polymerization, can be divided and added multiple times during polymerization, or can be added continuously during polymerization.

The suitable range for the amount of chain transfer agent to be added will differ depending on the chain transfer capability and polymerization conditions such as reaction temperature, polymerization pressure, and amount of polymerization initiator to be added. Therefore, this range cannot be stipulated unconditionally, but preferably will be 0.01 to 20 mol %, and more preferably 0.2 to 10 mol % in relation to the amount of TFE present in the reaction vessel. If the above amount to be added is less than 0.01 mol % in relation to the TFE present in the reaction vessel, a high-molecular weight component will be formed, resulting in poorer dispersibility when it is added to the matrix. If the above amount exceeds 20 mol %, an extremely low-molecular weight component with a molecular weight in a few thousands will be formed. In such a case, the high-temperature volatile component will be too large, and the product will be unsuited for applications wherein the temperature in the matrix dispersion step exceeds 300° C., thus limiting the utility thereof.

Any polymerization initiator previously used in TFE polymerization can be used for the above polymerization initiator. Preferably a water-soluble peroxide is used to carry out emulsion polymerization without the presence of a fluorine-containing surfactant.

Examples of the above water-soluble peroxide in the production process of the present invention include a persulfate, sulfite, water-soluble organic peroxide, and the like.

The above persulfate is not particularly limited herein, and examples include ammonium persulfate (APS), potassium persulfate (KPS), etc.

The above sulfite is not particularly limited herein, and examples include ammonium sulfite, potassium sulfite, etc.

Examples of the above water-soluble organic peroxide include benzoyl peroxide, disuccinic acid peroxide (DSP), diglutaric acid peroxide, etc.

When the above water-soluble peroxide is used as a polymerization initiator, the polymer terminal group from the initiator has a hydrophilic terminal functional group such as a carboxyl group, sulfonic acid group, or hydroxyl group. In the case of APS, KPS, and DSP the terminal group is a carboxyl group.

As noted above, in the production process of the present invention emulsified particles can be produced even without the presence of a fluorine-containing surfactant because if either a persulfate, sulfite, or water-soluble organic peroxide is used as the polymerization initiator, the terminal group from the initiator is a hydrophilic group.

One or more types of substances can be added as the above polymerization initiator. It is preferable that using the polymerization initiator makes the polymer terminal group a carboxyl group. From the standpoint of the proper decomposition temperature, ease of handling, and cost of the above water-soluble peroxide, and polymer terminal structure derived from the water-soluble peroxide, at least one type of compound selected from a group consisting of ammonium persulfate, potassium persulfate, ammonium sulfite, potassium sulfite, and disuccinic acid peroxide is even more preferable as the above water-soluble peroxide.

The amount of the above water-soluble peroxide to be added greatly depends on the type of the water-soluble peroxide, and the type and added amount of chain transfer agent to be used therewith, as well as the polymerization conditions such as polymerization temperature, polymerization pressure, and the like. Therefore, the proper amount to be added will differ according to polymerization, and cannot be stipulated unconditionally, but preferably the amount of the above water-soluble peroxide is 10 to 3000 ppm in relation to the aqueous medium from the standpoint of producing a polymer chain with a hydrophilic terminal group that provides an emulsifying effect. If the above added amount is less than 10 ppm in relation to the aqueous medium, productivity may decrease. Moreover, it is possible that emulsified particles of low-molecular weight PTFE will not be obtained, and high-molecular weight PTFE will be generated, which is likely to cause poor dispersion in the matrix as noted above. More preferably, the amount to be added is 50 to 2000 ppm in relation to the aqueous medium.

Preferably, a persulfate or sulfite will be used in combination with a water-soluble organic peroxide as the above polymerization initiator. In such a case at least one type selected from a group consisting of persulfates and sulfites, and at least one type of water-soluble organic peroxide can be selected as the above polymerization initiator. A different reagent with polymerization initiating activity can also be used. Whereas the above persulfates and sulfites have a short half-life and act as polymerization initiators from the start of polymerization, the above organic peroxides have a relatively longer half-life, and begin to act as a polymerization initiator later than the above persulfates and sulfites. Therefore, by combining the two types of polymerization initiators it is possible to lower and sharpen the molecular weight distribution. Using these polymerization initiators in combination is particularly preferred when polymerization is carried out at a solution temperature of 40° C. or more and less than 100° C. Here the term "solution temperature" refers to the temperature of the aqueous medium serving as the polymerization reaction solution.

Preferably the above polymerization initiator will comprise a persulfate or sulfite and/or a water-soluble organic peroxide, and a redox catalyst. Including a redox catalyst enables the reaction to proceed at lower temperature. This method that combines the use of a redox catalyst is especially preferred when, for example, polymerization is carried out at a solution temperature of 5 to 40° C.

Here the above expression "a persulfate or sulfite and/or a water-soluble organic peroxide, and a redox catalyst" refers to any of the following five combinations: persulfate and redox catalyst; sulfite and redox catalyst; organic peroxide and redox catalyst; persulfate, organic peroxide, and redox catalyst; or sulfite, organic peroxide, and redox catalyst.

Two or more types of each of the above persulfate, sulfite, organic peroxide, and redox catalyst can be used.

The substances disclosed above can be used as the above persulfate, sulfite, and organic peroxide.

The above redox catalyst is not particularly limited herein, and examples include metal carbonyl-carbon tetrachloride mixtures and peroxide-iron (II) compound mixtures.

At least one type of the above polymerization initiator should be water-soluble.

The above polymerization initiator can be present in the reaction vessel all at once when starting polymerization, can be divided and added multiple times during polymerization, or can be added continuously during polymerization.

The above aqueous medium is not particularly limited herein, but preferably it is deionized ultrapure water, for example.

The above emulsion polymerization step polymerizes at least tetrafluoroethylene to produce emulsified particles. The type of emulsion polymerization is not particularly limited herein provided it can produce emulsified particles. Preferably it produces emulsified particles of low-molecular weight PTFE with an average primary particle size of 1 μm or less that are dispersed in the aqueous medium.

In the above emulsion polymerization step, if the total amount of low-molecular weight PTFE produced therein is assigned a value of 100 mass %, preferably at least 90 mass %, more preferably at least 95 mass %, and even more preferably at least 98 mass % of the low-molecular weight PTFE is present in the form of an aqueous dispersion.

Here the above expression "present in the form of an aqueous dispersion" refers to the fact that the low-molecular weight PTFE produced in the above emulsion polymerization step does not agglomerate and is present in the form of emulsified particles. In other words, at least 90 mass %, more preferably at least 95 mass %, and even more preferably at least 98 mass % of the above low-molecular weight PTFE should be present in the form of emulsified particles.

The amount of agglomerated low-molecular weight PTFE solids accounts for preferably less than 10 mass %, more preferably less than 5 mass %, and even more preferably less than 2 mass % of the low-molecular weight PTFE produced in the emulsion polymerization step.

The average primary particle size of the emulsified particles (dispersed particles) produced in the above emulsion polymerization step is preferably 50 to 1000 nm, more preferably 100 to 1000 nm, and even more preferably 100 to 300 nm.

To determine the aforementioned average primary particle size, first a calibration curve is prepared wherein optical transmittance at 550 nm of a unit length of aqueous dispersion prepared to a polymer concentration of 0.22 mass % is plotted against average primary particle size determined by measuring particle diameter in a fixed direction using transmission electron micrographs. Next the transmittance of an aqueous dispersion of the target particles is measured, and that measurement is compared with the above calibration curve.

The above emulsion polymerization step can be carried out by first loading the aqueous medium and tetrafluoroethylene, modifying monomer as needed, chain transfer agent as needed, and surfactant as needed into a pressure-resistant reaction vessel equipped with a stirrer, adjusting the temperature and pressure, and then starting emulsion polymerization with stirring by adding the polymerization initiator. The above emulsion polymerization step can also be carried out by continuously supplying monomer to the above aqueous medium.

In the above emulsion polymerization step a desired tetrafluoroethylene copolymerizable modifying monomer can also be added as the above monomer in addition to the TFE. The modifying monomer is described below.

The above emulsion polymerization step is preferably carried out while stirring the aqueous medium, but the emulsified particles will agglomerate due to mechanical shear forces if the stirring is too vigorous, and the polymerization reaction will proceed at the gas-liquid interface. As a result, the polymerization will proceed by suspension polymerization, and emulsified particles comprising low-molecular weight PTFE may not be obtained. Therefore, in the above emulsion polymerization, given the same polymerization conditions of reaction scale, polymerization temperature and polymerization pressure, preferably the stirring speed will be lower than with conventional suspension polymerization of a fluoropolymer.

The stirring speed in the above emulsion polymerization can be suitably selected in accordance with the polymerization scale and other polymerization conditions by verifying that agglomerated particles are not produced at the gas-liquid interface, and it is not particularly limited herein. As noted above, however, emulsion polymerization can be carried out at a slow stirring speed provided at least 90 mass % of the low-molecular weight PTFE is present in the form of emulsified particles.

The polymerization conditions such as polymerization temperature, polymerization pressure, etc., in the above emulsion polymerization step are not particularly limited herein and can be suitably selected in accordance with the amount of TFE to be used, the type and amount of modifying agent to be added as needed, or productivity and the like. However, the polymerization temperature is preferably 5 to 100° C., and even more preferably 50 to 90° C. Moreover, the polymerization pressure is preferably 0.03 to 3.0 MPa.

In the above emulsion polymerization step the emulsified particles can be produced by self-emulsion polymerization. As used in the present application, the term "self-emulsion" refers to emulsification of the TFE monomer that can be carried out without the addition of a surfactant through the use of a chain transfer agent and a water-soluble peroxide. In other words, self-emulsion polymerization is polymerization wherein emulsion polymerization is carried out without adding a fluorocarbon emulsifier, fluorine-containing surfactant, etc., which have been conventionally used at the start and during emulsion polymerization of TFE.

In emulsion polymerization of TFE in which the reaction is conducted in an aqueous medium using only TFE and a water-soluble peroxide without the addition of a surfactant, nuclei (emulsified particles) are formed just as if emulsion polymerization has been carried out in a polymerization system at the very beginning of the reaction, and stable emulsified particles are produced thereby.

In the above emulsion polymerization step, it is believed that polymer chains having a hydrophilic terminal group originating in the water-soluble peroxide are formed at the start of polymerization even if a surfactant is not added to the reaction vessel, and because this has an emulsifying effect, emulsified particles are formed in the aqueous medium.

It is inferred that in the above self-emulsion polymerization, an aqueous dispersion with TFE polymer stably dispersed therein as emulsified particles is obtained:

(1) because polymer chains with a hydrophilic terminal group originating in the water-soluble peroxide (and therefore an emulsifying effect) grow as the result of the reaction between the chain transfer agent, water-soluble peroxide, and TFE, but during the extension process of said polymer chains the growing end thereof is inactivated by chain transfer between the chain transfer agent and the polymer chain, so short-chain TFE polymer is formed, and a decrease in the emulsifying effect that is accompanied by an increase in the degree of polymerization does not occur;

(2) because the abovementioned compounds used as the above chain transfer agent have high chain transfer capability, and therefore the degree of polymerization of the abovementioned short-chain TFE polymer is low and the emulsifying effect thereof is greater; and (3) because decomposition of the water-soluble peroxide continues after the start of polymerization, and therefore generation of short-chain TFE polymer with the abovementioned hydrophilic terminal group continues.

In the above self-emulsion polymerization, the reaction is carried out using the water-soluble peroxide, which adds a hydrophilic group to the polymer terminal, as a polymerization initiator and a compound with a relatively high chain transfer capability as a chain transfer agent. As a result, an aqueous dispersion of low-molecular weight PTFE with a high level of dispersion stability can be obtained without the addition of a surfactant.

Because in the above self-emulsifying polymerization the emulsion polymerization can be achieved without the addition of a surfactant at the start of and during polymerization, the manufacturing cost can be lowered. This process is also preferred because problems arising from the surfactant such as discoloration do not occur in the resulting low-molecular weight PTFE.

When emulsion polymerization is carried out in the above emulsion polymerization step without the addition of a surfactant, the low-molecular weight PTFE powder obtained by the production process of the present invention essentially contains no surfactant such as perfluorooctanoic acid (PFOA) and salts thereof, perfluorosulfonic acid (PFOS) and salts thereof, etc.

In the present application the expression "essentially contains no" refers to a material that is not used as a starting material and is present in an amount equivalent to 1 ppm or less of the polymer solids.

The above emulsion polymerization step can also be carried out in the presence of a surfactant. When this step is carried out in the presence of a surfactant, a water-soluble peroxide can be used as the polymerization initiator or another polymerization initiator can be used.

A preferred mode of the above emulsion polymerization step is a process wherein at least tetrafluoroethylene is polymerized to produce emulsified particles in the presence of a surfactant. When emulsion polymerization is carried out in the presence of a surfactant, a suitably optimal amount of surfactant to be added can be established in accordance with the emulsifying capability of the surfactant to be used, the polymerization conditions, and the like. Preferably, however, the amount is 500 ppm or less in relation to the aqueous medium, for example. If the amount exceeds 500 ppm, there is a chance that a smooth changeover to suspension polymerization will become very difficult and, for example, in some cases the amounts of acid and electrolyte to be added must be increased to forcibly agglomerate the emulsified particles. In addition, the particle size of the emulsified particles can be controlled by using a surfactant. Furthermore, because the amount of surfactant that is used will be less than in conventional emulsion polymerization, a reduction in manufacturing cost can be expected, and discoloration and other problems associated with the use of a surfactant will be less likely to occur. More preferably, 300 ppm or less of the surfactant is used.

The above surfactant is not particularly limited herein and, for example, a fluorine-containing surfactant, hydrocarbon surfactant, silicon surfactant, and the like can be used. In addition, the above surfactant can be a polymerizable surfactant that has an unsaturated bond within its molecule. For example, the surfactant can be a fluorine-containing or silicon surfactant with an unsaturated bond in its molecule, and can also be a hydrocarbon surfactant with an unsaturated bond in its molecule.

A preferred mode of the present invention is one wherein the above surfactant is a fluorine-containing surfactant. The term fluorine-containing surfactant refers to a compound that is a fluorinated compound containing at least one fluorine atom in its molecular structure and that exhibits surface activity.

The above fluorine-containing surfactant is not particularly limited herein but preferably is a fluorine-containing anionic surfactant. Examples include compounds having a $C_{7-12}$ hydrocarbon group wherein at least one hydrogen atom has been replaced by a fluorine atom and a hydrophilic group such as a carboxylic acid, carboxylate, sulfonic acid, sulfonate group, and the like. From an industrial standpoint, examples include ammonium perfluoroocatanoate, perfluorooctane sulfonate; perfluorocarboxylic acids and salts thereof, etc.

Preferably the fluorine-containing surfactant is the fluorine-containing anionic surfactant represented by general formula (I):

$$Rf^1\text{—}Y^1 \quad (I)$$

(wherein $Rf^1$ represents a $C_{2-12}$ straight chain or branched fluoroalkyl group optionally containing a divalent oxygen atom, and $Y^1$ represents —$COOM^1$, —$SO_3M^2$, —$SO_2NM^3M^4$ or —$PO_3M^5M^6$, and $M^1$, $M^2$, $M^3$, $M^4$, $M^5$, and $M^6$ can be the same or different and represent H or a monovalent cation). Examples of the above monovalent cation include —Na, —K, —$NH_4$, etc. Preferably, $Rf^1$ above is a $C_{2-6}$ straight chain or branched fluoroalkyl group optionally containing a divalent oxygen atom.

Preferably $Y^1$ in general formula (I) is —COOH, —COONa, —COOK, or —$COONH_4$, and —$COONH_4$ is more preferred.

Even more preferably, the fluorine-containing surfactant is the fluorine-containing anionic surfactant represented by general formula (II)

$$CF_3\text{—}(CF_2)_{n1}\text{—}Y^1 \quad (II)$$

(wherein n1 is an integer from 1 to 5, and $Y^1$ is the same as above); and the fluorine-containing anionic surfactant represented by general formula (III)

$$Rf^2O\text{—}Rf^3O\text{—}Rf^4\text{—}Y^1 \quad (III)$$

(wherein $Rf^2$ represents a $C_{1-3}$ fluoroalkyl group, $Rf^3$ and $Rf^4$ each independently represent a $C_{1-3}$ straight chain or branched fluoroalkylene group, a total carbon number of $Rf^2$, $Rf^3$, and $Rf^4$ is 6 or fewer, and $Y^1$ is the same as above).

Examples of the fluorine-containing anionic surfactant represented by general formula (II) include $CF_3(CF_2)_4COONH_4$, $CF_3(CF_2)_3COONH_4$, $CF_3(CF_2)_2COONH_4$, $CF_3(CF_2)_3SO_3Na$, $CF_3(CF_2)_3SO_2NH_2$, etc.

Examples of the fluorine-containing anionic surfactant represented by general formula (III) include the fluorine-containing anionic surfactant represented by the general formula $$CF_3O\text{—}CF(CF_3)CF_2O\text{—}CX^1(CF_3)\text{—}Y^1$$

(wherein $X^1$ represents H or F, and $Y^1$ is the same as above); the fluorine-containing anionic surfactant represented by the general formula $$CF_3O\text{—}CF_2CF_2CF_2O\text{—}CFX^1CF_2\text{—}Y^1$$

(wherein $X^1$ represents H or F, and $Y^1$ is the same as above); and the fluorine-containing anionic surfactant represented by the general formula $$CF_3CF_2O\text{—}CF_2CF_2O\text{—}CFX^1\text{—}Y^1$$

(wherein $X^1$ represents an H or F, and $Y^1$ is the same as above).

One type of the above fluorine-containing surfactant can be used alone, or two or more types can be used in combination.

A preferred mode of the present invention is one wherein the above surfactant is a hydrocarbon surfactant.

The above hydrocarbon surfactant is not particularly limited herein provided it is a surfactant that does not contain fluorine, and examples include anionic surfactants such as alkyl sulfate esters typified by ammonium lauryl sulfate, polyoxyethylene alkyl ether sulfate esters, fatty acids, and salts thereof; and nonionic surfactants such as polyoxyalkylene alkyl ether nonionic surfactants and polyoxyethylene alkyl phenyl ether nonionic surfactants.

Even more preferably, the nonionic surfactants is the polyoxyalkylene alkyl ether nonionic surfactant of general formula (IV)

$$R^1\text{—}O\text{-}A^1\text{-}H \quad (IV)$$

(wherein $R^1$ is a $C_{8-18}$ straight chain or branched primary or secondary alkyl group, and $A^1$ is a polyoxyalkylene chain formed by a copolymer chain of oxyethylene and oxypropylene or oxyalkylene chain) and the polyoxyethylene alkyl phenyl ether nonionic surfactant represented by general formula (V)

$$R^2\text{—}C_6H_4\text{—}O\text{-}A^2\text{-}H \quad (V)$$

(wherein $R^2$ is a $C_{4-12}$ straight chain or branched alkyl group, and $A^2$ is polyoxyalkylene chain).

The production process of the present invention includes an agglomeration step wherein the emulsified particles are agglomerated to form an agglomerated powder, and a suspension polymerization step wherein at least tetrafluoroethylene is polymerized in the presence of the agglomerated powder, a polymerization initiator, and an aqueous medium. The suspension polymerization step can be started after the agglomeration step or concurrently with the agglomeration step. The agglomeration step and suspension polymerization step can be carried out in the reaction vessel that was used for the emulsion polymerization step, or in a different reaction vessel. The agglomeration step can be carried out using special equipment providing a means whereby the emulsified particles are agglomerated. The above agglomerated powder is an agglomerate of the emulsified particles produced by the agglomeration thereof.

A method enabling forced agglomeration of the emulsified particles produced in the emulsion polymerization step can be used for the above agglomeration and, for example, preferably this involves adding at least an electrolyte, an acid, or both to the reaction vessel, and/or stirring at a greater speed than in the emulsion polymerization step.

Preferably the above agglomeration step is one wherein an electrolyte is added to the reaction vessel to agglomerate the emulsified particles. The emulsified particles can be easily agglomerated by adding an electrolyte.

From the standpoint of performing the above agglomeration efficiently, preferably the electrolyte is at least one type of compound selected from a group consisting of ammonium carbonate, ammonium bicarbonate, sodium hydroxide, and ammonium sulfate. The agglomeration of the emulsified particles can be carried out more efficiently thereby.

Preferably the above electrolyte is added at 50 to 10,000 ppm in relation to the aqueous medium. In particular, if a surfactant has been added, the emulsified particles may not be able to agglomerate sufficiently at an electrolyte concentration of less than 50 ppm because of the high stability of the emulsified particles. If an amount greater than 10,000 ppm is added, the electrolyte can remain in the polymer. More preferably, the electrolyte concentration is 100 to 5000 ppm. The agglomeration of the emulsified particles can be carried out more efficiently by adding the electrolyte within the above range.

Preferably, the above electrolyte has essentially no chain transfer capability. As an electrolyte with essentially no chain transfer capability, an inorganic salt is preferred, and examples include ammonium carbonate, ammonium bicarbonate, sodium hydroxide, ammonium sulfate, aluminum sulfate, and the like, but are not limited thereto.

One or more types of the above electrolyte can be added. The above electrolyte can be added all at once before or during the suspension polymerization step, can be suitably divided and added during the suspension polymerization step, or can be added continuously during the suspension polymerization step.

Preferably the above agglomeration step involves the addition of an acid to the reaction vessel. The emulsified particles can be easily agglomerated by the addition of an acid.

From the standpoint of carrying out the above agglomeration efficiently, preferably the above acid is at least one type of compound selected from a group consisting of nitric acid, sulfuric acid, and oxalic acid.

Preferably the above acid is added at 50 to 10,000 ppm in relation to the aqueous medium. In particular, if a surfactant has been added, the emulsified particles may not be able to agglomerate sufficiently at an acid concentration of less than 50 ppm because the stability of the emulsified particles is high. If an amount greater than 10,000 ppm is added, the acid can remain in the polymer. More preferably, the acid concentration is 100 to 5000 ppm. The agglomeration of the emulsified particles can be carried out more efficiently by adding the acid within the above range.

One or more types of the above acid can be added. The above acid can be added all at once before or during the suspension polymerization step, can be suitably divided and added during the suspension polymerization step, or can be added continuously during the suspension polymerization step.

The above suspension polymerization step can be carried out in a pressure-resistant reaction vessel equipped with a stirrer, while adjusting the temperature and pressure, and stirring the aqueous medium. The above suspension polymerization can also be carried out while continuously feeding monomer into the aqueous medium described above. In the above suspension polymerization, a modifying monomer described below can be added in addition to the TFE as the above monomer.

The polymerization conditions such as polymerization temperature, pressure, etc., in the above suspension polymerization step are not particularly limited herein, and can be suitably selected in accordance with the amount of TFE to be used, type and amount of modifying monomer, or productivity, etc. Preferably the polymerization temperature is 5 to 100° C., and more preferably 50 to 90° C. Preferably the polymerization pressure is 0.03 to 3.0 MPa.

Preferably the above suspension polymerization step results in solidification of at least 90 mass % of the low-molecular weight PTFE produced in the polymerization step. If at least 90 mass % of the low-molecular weight PTFE is solidified in the aqueous dispersion after suspension polymerization step, as noted above, it can be concluded that the agglomeration step of forcibly agglomerating the emulsified particles produced in the emulsion polymerization step and the suspension polymerization step of polymerizing at least TFE have been carried out. More preferably, 95 mass % or more of the emulsified particles is solidified, and even more preferably, 98 mass % or more thereof is solidified. The amount of low-molecular weight PTFE solids remaining in the liquid phase is preferably less than 2.5 mass % in relation to the aqueous medium, and more preferably less than 0.5 mass %. Preferably the stirring in the above suspension polymerization step is sufficiently carried out such that 90 mass % or more of the low-molecular weight PTFE is solidified.

Processing can be shortened by carrying out the above emulsion polymerization step and suspension polymerization step continuously because monomer polymerization is started in the emulsion polymerization step. More specifically, while emulsion polymerization is progressing, suspension polymerization begins during or after the forced agglomeration of the emulsified particles by adding the above electrolyte or acid to the aqueous medium, and/or making the stirring rate faster than in the emulsion polymerization step. A smooth changeover from emulsion polymerization to suspension polymerization can be accomplished by increasing the stirring rate.

Preferably the above method for forcing agglomeration involves combining the method of increasing the stirring rate and the method of adding an electrolyte or acid to the aqueous medium, and this combined method is particularly suitable if a surfactant has been added.

Preferably in the above emulsion polymerization step and suspension polymerization step the amount of monomer consumed, when expressed as mass ratio of the total amount of monomer consumed, is emulsion polymerization step:suspension polymerization step=(3 to 80):(20 to 97). The advantageous effect of the present invention is displayed by making the amounts of monomer consumed in the emulsion polymerization step and suspension polymerization step fall within the above range. For example, when used as an additive for a coating material, etc., not only can excellent texture and gloss be obtained in the formed coating film, but the dispersibility and viscosity of the coating material can also be improved thereby. More preferably the mass ratio of monomer consumed in the two steps is emulsion polymerization step:suspension polymerization step=(5 to 60):(40 to 95), and even more preferably emulsion polymerization step:suspension polymerization step=(10 to 50):(50 to 90).

In the polymerization method of the present invention comprising the above emulsion polymerization step and suspension polymerization step, from the standpoint of productivity, preferably the polymer yield at the end of polymerization is at least 10%, and more preferably at least 20% in relation to the aqueous medium.

The production process of the present invention preferably includes a collection step wherein the low-molecular weight polytetrafluoroethylene powder is collected from the reaction vessel after the suspension polymerization step wherein at least tetrafluoroethylene is suspension polymerized to produce low-molecular weight PTFE powder. In the above collection step the collection method is not particularly limited herein provided the low-molecular weight PTFE powder produced by suspension polymerization is collected from the reaction vessel. For example, the low-molecular weight PTFE powder floating in the aqueous medium of the reaction vessel can be collected by scooping, etc.

A preferred mode of the production process of the present invention also comprises: a loading step wherein an aqueous medium and at least tetrafluoroethylene are loaded into a reaction vessel; a polymerization initiation step wherein a polymerization initiator is added to initiate polymerization; an emulsion polymerization step wherein at least tetrafluoroethylene is polymerized in the presence of the polymerization initiator and the aqueous medium to produce emulsified particles; an agglomeration step wherein the emulsified particles are agglomerated while polymerization is continued to produce an agglomerated powder; a suspension polymerization step wherein at least tetrafluoroethylene is polymerized during or after the agglomeration step in the presence of the agglomerated powder, polymerization initiator, and aqueous medium; and a collection step wherein low-molecular weight polytetrafluoroethylene powder is collected from the reaction vessel.

A preferred mode of the production process of the present invention also comprises: a loading step wherein an aqueous medium and at least tetrafluoroethylene are loaded into a reaction vessel; a polymerization initiation step wherein a polymerization initiator is added to initiate polymerization; an emulsion polymerization step wherein at least tetrafluoroethylene is polymerized in the presence of the polymerization initiator and the aqueous medium to produce emulsified particles; a collection step wherein an aqueous dispersion containing the emulsified particles is collected from the aforementioned reaction vessel; a loading step wherein the collected aqueous dispersion is loaded into the aforementioned reaction vessel or a reaction vessel different from the aforementioned reaction vessel; a loading step wherein an aqueous medium and at least tetrafluoroethylene are loaded into said reaction vessel; an agglomeration step wherein the emulsified particles in the aqueous dispersion are agglomerated to produce an agglomerated powder; a suspension polymerization step wherein at least tetrafluoroethylene is polymerized in the presence of the agglomerated powder, polymerization initiator, and aqueous medium; and a collection step wherein low-molecular weight polytetrafluoroethylene powder is collected from the reaction vessel.

A preferred mode of the production process of the present invention also comprises: a loading step wherein an aqueous medium and at least tetrafluoroethylene are loaded into a reaction vessel; a polymerization initiation step wherein a polymerization initiator is added to initiate polymerization; an emulsion polymerization step wherein at least tetrafluoroethylene is polymerized in the presence of the polymerization initiator and the aqueous medium to produce emulsified particles; an agglomeration step wherein the emulsified particles are agglomerated to produce an agglomerated powder; a collection step wherein the agglomerated powder is collected from the reaction vessel; a loading step wherein the agglomerated powder, aqueous medium, and at least tetrafluoroethylene are loaded into the aforementioned reaction vessel or a reaction vessel different from the aforementioned reaction vessel; a suspension polymerization step wherein at least tetrafluoroethylene is polymerized in the presence of the agglomerated powder, polymerization initiator, and aqueous medium; and a collection step wherein low-molecular weight polytetrafluoroethylene powder is collected from the reaction vessel.

A preferred mode of the production process of the present invention also comprises: a loading step wherein an aqueous medium and at least tetrafluoroethylene are loaded into a reaction vessel; a polymerization initiation step wherein a polymerization initiator is added to initiate polymerization; an emulsion polymerization step wherein at least tetrafluoroethylene is polymerized in the presence of the polymerization initiator and the aqueous medium to produce emulsified particles; a collection step wherein an aqueous dispersion containing the emulsified particles is collected from the aforementioned reaction vessel; a loading step wherein the collected aqueous dispersion is loaded into a agglomerator; an agglomeration step wherein the emulsified particles are agglomerated in the agglomerator to produce an agglomerated powder; a collection step wherein the agglomerated powder is collected; a loading step wherein the agglomerated powder, aqueous medium, and at least tetrafluoroethylene are loaded into the aforementioned reaction vessel or a reaction vessel different from the aforementioned reaction vessel; a suspension polymerization step wherein at least tetrafluoroethylene is polymerized in the presence of the agglomerated powder, polymerization initiator, and aqueous medium; and a collection step wherein low-molecular weight polytetrafluoroethylene powder is collected from the reaction vessel.

The polymerization initiator present in the suspension polymerization step can be the same initiator added to begin the emulsion polymerization step, an initiator that is added supplementally after the end of the emulsion polymerization step, or an initiator that is added supplementally during the suspension polymerization step.

The low-molecular weight polytetrafluoroethylene powder (hereinafter, also called "low-molecular weight PTFE powder) obtained by the production process of the present invention comprises low-molecular weight polytetrafluoroethylene (hereinafter, also called "low-molecular weight PTFE).

The present invention also includes the low-molecular weight PTFE powder obtained by the above production process.

The above low-molecular weight PTFE has a number-average molecular weight of 600,000 or less. If the number-average molecular weight exceeds 600,000, fibrils can develops and the PTFE can easily agglomerate, so microdispersibility may be adversely affected. Preferably, the number-average molecular weight of the above low-molecular weight PTFE will fall in the above range, and the lower limit thereof can be established at 10,000, for example. If the number-average molecular weight is less than 10,000, the PTFE will be very volatile at high temperatures and cannot be used in heat-resistant coating materials such as those that require baking.

The number-average molecular weight of the above low-molecular weight PTFE is a value calculated from the melt viscosity obtained by measurement with a flow tester.

The above low-molecular weight PTFE preferably has a melt viscosity of 700,000 Pa·s or less at 380° C. By establishing the melt viscosity within the above range a low-molecular weight PTFE with a number-average molecular weight of 600,000 or less can be obtained.

Preferably the melt viscosity at 380° C. is 10,000 Pa·s or less, and more preferably 5000 Pa·s or less. If the melt viscosity is too high, the transparency of the coated film may decrease when the low-molecular weight PTFE is used as an additive for a coating material.

The above melt viscosity is measured according to ASTM D1238 using a flow tester (Shimadzu Corporation) and a 2φ-8 L die, and is a value measured by preheating 2 g of test sample for 5 min at 380° C. and measuring the same with a load of 0.7 MPa while maintaining that temperature. The above number-average molecular weight is a value calculated from the melt viscosity measured according to the above measurement method.

Preferably, the melting point of the above low-molecular weight PTFE is 324 to 333° C.

An SII Nanotechnology, Inc. differential scanning calorimeter model RDC220 (DSC) is used, and after the temperature is calibrated using indium and lead as preliminary standard samples, approximately 3 mg of the low-molecular weight PTFE powder is placed in an aluminum pan (crimped container) and the temperature is raised 10° C./min in the 250 to 380° C. range under a 200 mL/min air flow. The melting point is defined as the minimum point of required melting heat within the above range.

The above production process includes the polymerization of at least tetrafluoroethylene to produce emulsified particles, and it can also include the polymerization of tetrafluoroethylene and modifying monomer that is copolymerizable therewith (hereinafter, also called a "modifying agent").

In other words, the above low-molecular weight PTFE is a tetrafluoroethylene homopolymer (TFE homopolymer) and/or a modified polytetrafluoroethylene (modified PTFE).

In the present application the expression "TFE homopolymer and/or modified PTFE" refers to a polymer comprising TFE homopolymer and not containing modified PTFE, a polymer comprising modified PTFE and not containing TFE homopolymer, or a polymer comprising both TFE homopolymer and modified PTFE.

The "polytetrafluoroethylene" in the above term "low-molecular weight PTFE" may generally be used to represent the above TFE homopolymer, but because it is clear that the above "low-molecular weight PTFE" in the present application encompasses a TFE homopolymer and/or modified PTFE, this term is by no means limited to the TFE homopolymer, which is merely part of the above term "low-molecular weight PTFE." Thus, the above term "low-molecular weight PTFE" is used as a single expression to represent the entire scope of TFE homopolymer and/or modified PTFE.

The above TFE homopolymer is obtained by the polymerization of tetrafluoroethylene (TFE) alone as a monomer.

The above modified PTFE refers to a polymer obtained by the polymerization of TFE and a modifying agent.

The modifying agent in the above modified PTFE is not particularly limited herein provided it is copolymerizable with TFE, and examples include perfluoroolefins such as hexafluoropropene (HFP), etc.; chlorofluoroolefins such as chlorotrifluoroethylene (CTFE), etc.; hydrogen-containing fluoroolefins such as trifluoroethylene, vinylidene fluoride (VdF), etc.; perfluorovinyl ethers; perfluoroalkyl ethylenes such as perfluorobutylethylene, etc.; and ethylene. One or more types of modifying agent can be used.

The above perfluorovinyl ether is not particularly limited herein, and examples include perfluoro unsaturated compounds represented by general formula (VI):

$$CF_2\!=\!CF\!-\!Orf \qquad\qquad (VI)$$

(wherein Rf represents a perfluoro organic group). In the present application the above term "perfluoro organic group" refers to an organic group wherein all hydrogen atoms bonded to carbon atoms are replaced by fluorine atoms. The above perfluoro organic group can also contain an ether oxygen.

Examples of the above perfluoro vinyl ether include the perfluoro (alkyl vinyl ether) (PAVE) wherein, in above general formula (VI), Rf represents a $C_{1-10}$ perfluoroalkyl group. Preferably the number of carbons in the above perfluoroalkyl group is 1 to 5.

Examples of the perfluoroalkyl group in the above PAVE include a perfluoromethyl group, perfluoroethyl group, perfluoropropyl group, perfluorobutyl group, perfluoropentyl group, perfluorohexyl group, etc., and preferably is a perfluoropropyl group.

Examples of the above perfluorovinyl ether include a perfluoro(alkoxy alkyl vinyl ether) or perfluoro(alkyl polyoxy alkylene vinyl ether) in which, in general formula (VI), Rf is a $C_{4-9}$ perfluoro(alkoxy alkyl) group, an organic group with the formula:

[Chemical Formula 1]

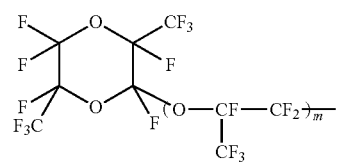

(wherein m represents 0 or an integer from 1 to 4), or an organic group with the formula:

[Chemical Formula 2]

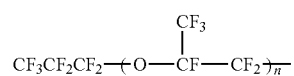

(wherein n represents an integer from 1 to 4).

As the modifying agent in the above modified PTFE, a perfluoro vinyl ether or chlorotrifluoroethylene is preferable, and as a perfluoro vinyl ether, PAVE is preferable.

When the above perfluoro vinyl ether is used as the above modifying agent in the above modified PTFE, normally the ratio (mass %) of the above modifying agent in relation to the total of the above modifying agent and TFE is, for example, 1 mass % or less, and more preferably 0.001 to 1 mass %.

One or more types of modified PTFE with, for example, different number-average molecular weights or copolymer compositions can be present as the above modified PTFE.

One or more types of TFE homopolymers with, for example, different number-average molecular weights can be present as the above TFE homopolymer.

An unstable terminal group originating in the chemical structure of the above polymerization initiator or above chain transfer agent can be formed as the terminal molecular chain of the above low-molecular weight PTFE. The above unstable terminal group is not particularly limited herein, and examples include —$CH_2OH$, —COOH, —$COOCH_3$, etc.

The above low-molecular weight PTFE can be one wherein an unstable terminal group has been stabilized. The method for stabilization of the above unstable terminal group is not particularly limited herein, and examples include a method wherein the terminal group is modified to a trifluoromethyl group (—$CF_3$) by exposure to a fluorine-containing gas.

The above low-molecular weight PTFE can also be one wherein terminal amidation has been carried out. The method of the above terminal amidation is not particularly limited herein, and examples include bringing a fluorocarbonyl group (—COF) obtained by exposure to the above fluorine-containing gas, etc., into contact with ammonia gas as disclosed in Japanese Patent Application Laid-open No. H4-020507.

If the above low-molecular weight PTFE is one wherein stabilization or amidation of the above unstable terminal group has been carried out, the resulting low-molecular weight PTFE powder of the present invention can blend easily with the counter material and improve the dispersibility thereof when used as an additive to a counter material such as a coating material, grease, cosmetic, etching solution, toner, plastic, and the like.

Preferably, the low-molecular weight PTFE powder of the present invention has a specific surface area of 4 to 10 $m^2/g$. When the specific surface area lies within the above range, splashing and adherence of the powder to the hopper can be decreased because the specific surface area is relatively small. If this ratio is less than 4 $m^2/g$, micro-dispersion into the matrix material may be adversely affected. On the other hand, if the ratio is greater than 10 $m^2$, there is a large surface improving effect, e.g., the texture of the coated surface will be improved, etc., and the amount of absorbed oil will increase so a stable dispersion in the matrix material can be obtained, but the dispersibility in a coating material, etc., may be adversely affected, and the viscosity of the coating material, etc., may increase. Preferably, the upper limit of the specific surface area is 8 $m^2$, and the lower limit is 5 $m^2$.

In the present application the specific surface area is a value measured by BET using a surface analyzer (MONOSORB, product of Quantachrome Corp.) with a mixed gas of 30% nitrogen and 70% helium as the carrier gas and liquid nitrogen as the coolant.

Preferably the average particle size of the low-molecular weight PTFE powder of the present invention is 0.5 to 30 μm. Because this is a powder with a relatively small average particle size, when used as an additive in a coating material, for example, a coating film with superior surface gliding properties can be formed therefrom. Preferably the average particle size of the low-molecular weight PTFE power of the present invention is 20 μm or less.

The above average particle size was measured using a laser diffraction type particle size distribution analyzer (product of Japan Laser Corporation) at a pressure of 0.1 MPa and a measurement time of 3 seconds without cascade impaction, and was considered to be equal to the particle size corresponding to a value of 50% of the cumulative volume in the resulting particle size distribution.

The above low-molecular weight PTFE powder is a powdered solid comprising low-molecular weight PTFE.

The low-molecular weight PTFE powder of the present invention can be ground. In other words, a preferred mode of the production process for the low-molecular weight PTFE powder of the present invention further includes a grinding step wherein the low-molecular weight polytetrafluoroethylene powder is ground. Preferably, the above grinding step is carried out after the collection step.

In another preferred mode the average particle size of the low-molecular weight PTFE powder of the present invention is 5 μm or less. Because the powder has an even smaller particle size, when used as an additive in a coating material, for example, a coating film with superior surface gliding properties can be formed therefrom. A low-molecular weight PTFE powder wherein the average particle size falls within the above range can easily be obtained by grinding.

The above grinding method is not limited herein, and one example is grinding with a grinder. One preferred method is to first irradiate the low-molecular weight PTFE powder obtained from the suspension polymerization step with radiation as needed, and then grind the same in a grinder.

Examples of grinders include impact type grinders such as a hammer mill, pin mill, and jet mill, and grinding type grinders such as a cutter mill wherein grinding occurs due the shear forces generated by unevenness between a rotating blade and an peripheral stator. Preferably the grinding temperature ranges from −200 to 100° C. Freeze-grinding generally is carried out at −200 to −100° C., but grinding can also be carried out at room temperature (10 to 30° C.). In general, liquid nitrogen is used in freeze-grinding, but the equipment is very large and the grinding cost also becomes expensive. From the standpoint of process simplicity and holding down grinding costs, preferably grinding is carried out at room temperature (10° C.) to 100° C., and grinding at a temperature near room temperature (10° C. to 30° C.) is suitable.

After the above grinding, first the microparticles and fibrous particles are removed by air sifting, and then coarse particles can be removed by further sorting.

In air sifting the ground particles are fed into a cylindrical sifting chamber by a suction air flow, distributed by the swirling air flow in the chamber, and the particles are then sifted by centrifugal force. Microparticles are collected from the center in a cyclone and bag filter. A rotating body such as a conical cone or rotor is provided in the sifting chamber to impart a uniform swirling movement to the ground particles and air.

When a sifting cone is used, adjustment of the sifting point is carried out by adjusting the volume of the secondary air flow and the sifting cone gap. When a rotor is used, the flow volume in the sifting chamber is adjusted by the rotor speed.

Examples of methods for removing coarse particles include air sifting with a mesh, a vibrating sieve, or an ultrasonic sieve, but air sifting is preferred.

In another preferred mode the low-molecular weight PTFE powder of the present invention is irradiated with radiation. In other words, preferably the production process for the low-molecular weight PTFE powder further includes an irradiation step wherein the low-molecular weight PTFE powder is irradiated with radiation. Such a mode can also include the grinding step described above subsequent to the above irradiation step. Preferably the above irradiation step is carried out after the collection step.

Examples of the above radiation include γ-radiation, electron beam, X-rays, and the like, but preferably the radiation is an electron beam or γ-radiation.

The low-molecular weight PTFE powder of the present invention can be thermally degraded through pyrolysis. In other words, in the process for producing a low-molecular weight PTFE powder according to the present invention a preferred mode of the present invention further includes a pyrolysis step wherein the low-molecular weight PTFE collected in the collection step is thermally degraded. The grinding step described above can be carried out after the above pyrolysis step.

The low-molecular weight PTFE powder of the present invention can also be coalesced. In other words, the production process for the low-molecular weight PTFE powder of the present invention can also include a step wherein the low-molecular weight PTFE powder produced in the suspension polymerization step can be coalesced by performing a heat treatment.

Preferably, the above heat treatment temperature is 250° C. or more and less than 340° C. Preferably the lower limit of the above heat treatment temperature is 300° C., and the upper limit is the melting point of the low-molecular weight PTFE, e.g., 330° C.

The coalesced low-molecular weight PTFE powder of the present invention can be in a "completely coalesced" state wherein all of the particles of low-molecular weight PTFE powder are completely coalesced, as well as "half-coalesced" and "semi-coalesced" states wherein some of the particles or parts of single particles are coalesced.

The particles of low-molecular weight PTFE powder fuse together by point contact as a result of the heat treatment, and as a whole form clumps that are bonded into single units by weak bonding forces.

As a result of the above heat treatment the movement of the polymer chains within individual particles of the low-molecular weight PTFE powder increases and they become intertwined. As a result, the individual particles tend to shrink to form a small, dense structure. The apparent density of the individual particles obtained from the above heat treatment generally becomes greater than in a powder before the heat treatment, so the splashing of the powder decreases, and the hopper packing properties are increased by an increase in powder fluidity.

A grinding treatment to the desired size can be carried out on the clumps obtained from the above heat treatment. Preferably, the above grinding treatment is carried out such that individual particles of the above low-molecular weight PTFE powder can be separated. The grinding treatment can be carried out by the grinding methods described above.

As noted above, through the use of the low-molecular weight PTFE of the present invention as an additive in a coating material, etc., a coating film with excellent texture and gliding properties can be formed and the dispersibility and viscosity thereof can be improved. In other words, the above low-molecular weight PTFE can be used most suitably as an additive for various kinds of materials. More specifically, it is most preferably used as the kind of additive illustrated below.

The present invention also includes an additive comprising the low-molecular weight polytetrafluoroethylene powder obtained by the above production process. Preferably the above additive is an additive for a coating material composition, grease composition, cosmetic composition, etching solution composition, toner composition, or plastic composition.

The present invention is also a composition comprising a low-molecular weight polytetrafluoroethylene powder. Preferably the above composition is a coating material, grease, cosmetic, etching solution, toner, or plastic.

In the various applications noted above, the low-molecular weight PTFE powder of the present invention can serve as an additive that combines the merits of a low-molecular weight PTFE powder obtained by emulsion polymerization that can impart excellent texture and glossiness, etc., and the merits of a low-molecular weight PTFE powder obtained by suspension polymerization that can improve dispersibility and improve viscosity.

The additive to the above coating material, grease, cosmetic, etching solution, toner, and plastic compositions can be processed by conventional methods for these applications and can be used together with other additives, etc. A composition, i.e., the above coating material, grease, cosmetic, etching solution, toner, or plastic can be produced by mixing the additive with a counter material commonly used in each application by conventional methods.

EFFECT OF THE INVENTION

The process for producing the aqueous dispersion of the low-molecular weight PTFE of the present invention comprises the configurations disclosed above, and the low-molecular weight PTFE powder of the present invention can be suitably used as an additive for improving a coating material, grease, cosmetic, etching solution, toner, plastic, etc. Using the low-molecular weight PTFE powder obtained by the production process of the present invention as an additive in a coating material, etc., not only enables a coating film with excellent texture and gliding properties to be formed, but also can improve the dispersibility and viscosity thereof.

MODE FOR CARRYING OUT THE INVENTION

The present invention is described in even greater detail through examples below, but is by no means limited thereto. In the examples and comparative examples, the terms "parts" and "%" refer to "parts by weight" and "wt %" unless otherwise stated.

Polymerization of Low-Molecular Weight PTFE Powder

COMPARATIVE EXAMPLE 1

First 2760 g of deionized water was loaded into a 6 L stainless steel autoclave equipped with two stainless steel flat stirring blades and a temperature control jacket, and the autoclave was closed. After pressurization with nitrogen gas, degassing was repeated multiple times to remove oxygen from the system. Then 1.8 g of ethane as the chain transfer agent was piped in under pressure with tetrafluoroethylene (TFE), and the internal pressure of the vessel was set to 0.10 MPa. While stirring at 700 rpm, the temperature in the vessel was raised, and when it reached 85° C., TFE was piped in under pressure once more, and the internal pressure was adjusted to 0.80 MPa.

As the polymerization initiator, an aqueous solution prepared by dissolving 700 mg of disuccinic peroxide (DSP) in 20 g of deionized water and an aqueous solution prepared by dissolving 700 mg of ammonium persulfate (APS) in 20 g of deionized water were piped in under pressure into the vessel with TFE. The internal pressure of the vessel decreases with decomposition of the polymerization initiator, so TFE was continuously fed into the vessel to maintain an internal pressure of 0.80±0.05 MPa. During the polymerization reaction the internal temperature was constantly controlled at 85±1° C., and the stirring rate was controlled at 700 rpm.

When the consumption of TFE reached 700 g, the stirring was stopped and the vessel was depressurized. After polymerization the wet polymer powder on the surface and within the liquid was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 1 shows the results.

COMPARATIVE EXAMPLE 2

First 2750 g of deionized water, 90 g of paraffin wax, and 14 g of a 20% aqueous solution of ammonium perfluorooctanoate were loaded into a 6 L stainless steel autoclave equipped with a stainless steel anchor-shaped stirring blade and a temperature control jacket, and the autoclave was closed. Thereafter, the polymerization reaction was carried out in the same manner as Comparative Example 1 except the stirring rate during the polymerization reaction was controlled at 300 rpm.

After polymerization no polymer powder was present on the surface of the liquid, and an aqueous dispersion of low-molecular weight PTFE was obtained. Table 1 shows the concentration of solids in the aqueous phase of this aqueous dispersion. Then 2 g of nitric acid was added to 2000 g of the above aqueous dispersion of low-molecular weight PTFE, and the polymer was coagulated by applying strong mechanical shear forces, and the resulting wet powder was rinsed in water and filtered and dried for 18 hours in a hit air circulating drier at 160° C. to obtain low-molecular weight PTFE powder. The concentration of solids was measured in the aqueous phase of the liquid dispersion after the polymer powder had been filtered off. Table 1 shows the results.

REFERENCE EXAMPLE 1

The polymerization reaction was performed in the same manner as Comparative Example 1 except the stirring rate during polymerization was controlled at 350 rpm, and stirring was stopped when 315 g of TFE had been consumed.

A small amount of wet polymer powder was floating on the surface of the liquid after polymerization. The floating powder was rinsed with deionized water and filtered. Table 1 shows the concentration of solids in the aqueous phase after filtration. The filtered polymer powder was dried for 18 hours in a hot air circulating drier at 160° C. The yield of the powder obtained after drying was 2.5 g.

The aqueous phase after polymerization was an aqueous dispersion of white low-molecular weight PTFE.

EXAMPLE 1

The polymerization reaction was carried out in the same manner as Reference Example 1, but the stirring rate was changed to 700 rpm when TFE consumption reached 175 g, and the polymerization reaction was continued until an additional 525 g of TFE had been consumed.

Stirring was stopped when a total TFE consumption reached 700 g, and the vessel was depressurized. The wet polymer powder on the surface and in the liquid after polymerization was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 1 shows the results.

EXAMPLE 2

The polymerization was carried in the same manner as Reference Example 1, but when the TFE consumption reached 175 g, an aqueous solution prepared by dissolving 3.4 g of oxalic acid dihydrate in 20 g of deionized water was piped in into the vessel with TFE, and while controlling the stirring speed at 350 rpm, the polymerization was carried out until an additional 525 g of TFE had been consumed.

Stirring was stopped when a total TFE consumption reached 700 g, and the vessel was depressurized. The wet polymer powder on the surface and in the liquid after polymerization was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 1 shows the results.

EXAMPLE 3

The polymerization reaction was carried out in the same manner as Example 2 except after TFE consumption reached 175 g, the stirring rate was controlled at 700 rpm until 700 g of TFE had been consumed.

The wet polymer powder on the surface and in the liquid after polymerization was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 1 shows the results.

EXAMPLE 4

The polymerization reaction was carried out in the same manner as Example 3 except the injection of the aqueous solution of oxalic acid dihydrate into the reaction vessel was performed when TFE consumption reached 50 g, and the polymerization reaction was carried out until an additional 650 g of TFE had been consumed.

The wet polymer powder on the surface and in the liquid after polymerization was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 2 shows the results.

EXAMPLE 5

The polymerization reaction was carried out in the same manner as Example 3 except that the ethane load was changed to 0.2 g, and the injection of the aqueous solution of oxalic acid dihydrate into the reaction vessel was performed when TFE consumption reached 105 g, and the polymerization reaction was carried out until an additional 595 g of TFE had been consumed.

The wet polymer powder on the surface and in the liquid after polymerization was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 2 shows the results.

EXAMPLE 6

The polymerization reaction was carried out in the same manner as Example 3 except the injection of the aqueous solution of oxalic acid dihydrate into the reaction vessel was performed when TFE consumption reached 315 g, and the polymerization reaction was carried out until an additional 385 g of TFE had been consumed.

The wet polymer powder on the surface and in the liquid after polymerization was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 2 shows the results.

REFERENCE EXAMPLE 2

The polymerization reaction was carried out in the same manner as Reference Example 1 except 1.12 g of a 50% aqueous solution of ammonium perfluorohexanoate (APFHx) was loaded together with the 2760 g of deionized water A small amount of wet polymer powder was floating on the surface of the liquid after polymerization. The floating powder was rinsed with deionized water and filtered. The filtered polymer powder was dried for 18 hours in a hot air circulating drier at 160° C. The yield of the powder obtained after drying was 1.2 g. The concentration of solids was measured in the aqueous phase of the liquid dispersion after the polymer powder had been filtered off. Table 2 shows the results.

The aqueous phase after polymerization was an aqueous dispersion of white low-molecular weight PTFE.

EXAMPLE 7

The polymerization reaction was carried out in the same manner as Reference Example 2. When TFE consumption reached 315 g an aqueous solution prepared by dissolving 430 mg of oxalic acid dihydrate in 20 g of deionized water was piped in under pressure into the reaction vessel with TFE, the stirring speed was controlled at 700 rpm, and the polymerization reaction was carried out until an additional 385 g of TFE had been consumed.

Stirring was stopped when a total TFE consumption reached 700 g, and the vessel was depressurized. The wet polymer powder on the surface and in the liquid after polymerization was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 2 shows the results.

EXAMPLE 8

The polymerization reaction was carried out in the same manner as Example 7 except the injection of the aqueous solution of oxalic acid dihydrate into the reaction vessel was performed when TFE consumption reached 490 g, and the polymerization reaction was carried out until an additional 210 g of TFE had been consumed.

The wet polymer powder on the surface and in the liquid after polymerization was rinsed with deionized water and separated by filtration. The filtered polymer powder was dried for 18 hours in a hot air circulating drier at 160° C. to obtain low-molecular weight PTFE powder. The concentration of solids was measured in the aqueous phase of the liquid dispersion after the polymer powder had been filtered off. Table 2 shows the results.

Physical property evaluations (1) and (2) below were carried out on the liquid phase after polymerization or aqueous dispersion of low-molecular weight PTFE that resulted from each of the Comparative Examples, and the Examples or Reference Examples, and physical property evaluations (3) to (6) below were carried out on the low-molecular weight PTFE powder obtained in each of the Comparative Examples and Examples.

(1) Concentration of Solids in Aqueous Dispersion (P %)

Based on the residue after heating (Z g) when the aqueous dispersion (X g) was heated for 3 hours at 150° C., the solids were determined by the formula: $P=Z/X\times100(\%)$.

(2) Average Primary Particle Size

To determine the average primary particle size, first a calibration curve was prepared wherein optical transmittance at 550 nm of a unit length of aqueous dispersion prepared to a polymer concentration of 0.22 mass % was plotted against average primary particle size determined by measuring particle diameter in a fixed direction using transmission electron micrographs. Next the transmittance of an aqueous dispersion of the target particles was measured, and that measurement was compared with the above calibration curve.

(3) Average Particle Size

The average particle size was measured using a laser diffraction type particle size distribution analyzer (product of JEOL, Ltd.) at a pressure of 0.1 MPa and a measurement time of 3 seconds without cascade impaction, and was considered to be equal to the particle size corresponding to 50% of the cumulative volume in the resulting particle size distribution.

D90 was considered to be the particle sizes at 90% of the cumulative volume in the particle size distribution, and D10 was considered to be the particle size at 10% of the cumulative volume in the particle size distribution. The percentage of particles 1 μm or less was considered to be a cumulative volume of 1 μm or less in the particle size distribution.

(4) Melt Viscosity

The melt viscosity was measured according to ASTM D1238 using a flow tester (Shimadzu Corporation) and a 2φ-8 L die, and was a value measured by preheating 2 g of test sample for 5 min at a predetermined temperature (340° C. or 380° C.) and measuring the same with a load of 0.7 MPa while holding that temperature.

(5) Melting Point

An SII Nanotechnology, Inc. differential scanning calorimeter model RDC220 (DSC) was used, and after the temperature was calibrated using indium and lead as preliminary standard samples, approximately 3 mg of the low-molecular weight PTFE powder was placed in an aluminum pan (crimped container) and the temperature was raised 10° C./min in the 250 to 380° C. range under a 200 mL/min air flow. The melting point was defined as the minimum point of melting heat within the above range.

(6) Specific Surface Area

The specific surface area was measured by BET using a surface analyzer (MONOSORB, product of Quantachrome Corp.) A mixed gas of 30% nitrogen and 70% helium was used as the carrier gas, and liquid nitrogen was used as the coolant.

Tables 1 and 2 show the results of the above measurements.

TABLE 1

|  |  | Comparative Example 1 | Comparative Example 2 | Reference Example 1 | Example 1 | Example 2 | Example 3 |
|---|---|---|---|---|---|---|---|
| Chain transfer agent(ethane) | g | 1.8 | 1.8 | 1.8 | 1.8 | 1.8 | 1.8 |
| Emulsion polymerization step | Stirring speed | rpm | — | 300 | 350 | 350 | 350 | 350 |
|  | Consumption of TFE | g | — | 700 | 315 | 175 | 175 | 175 |
|  | Compound added | — | — | APFO | — | — | — | — |
|  | Amount | g | — | 2.8 | — | — | — | — |
| Suspension polymerization step | Stirring speed | rpm | 700 | — | — | 700 | 350 | 700 |
|  | Consumption of TFE | g | 700 | — | — | 525 | 525 | 525 |
|  | Compound added | — | — | — | — | — | Oxalic acid dihydrate | Oxalic acid dihydrate |
|  | Amount | g | — | — | — | — | 3.4 | 3.4 |
| Concentration of solid in aqueous phase | wt % | 0.22 | 20.1 | 10.2 | 0.15 | 0.30 | 0.05 |
| Average primary particle size | nm | — | 190 | 170 | — | — | — |
| Average particle size | μm | 17.5 | 3.7 | — | 10.7 | 13.2 | 10.5 |
| D90 | μm | 47.3 | 9.3 | — | 28.7 | 41.4 | 28.4 |
| D10 | μm | 4.4 | 1.0 | — | 2.3 | 3.1 | 2.2 |
| D90/D10 | — | 10.9 | 9.4 | — | 12.5 | 13.5 | 12.7 |
| Percentage of particles 1 μm or less | % | 0 | 10.1 | — | 5.0 | 4.7 | 4.5 |
| Melting point | °C. | 326 | 326 | — | 326 | 326 | 326 |
| Melt viscosity | Pa·s | $9.1 \times 10^2$ | $3.0 \times 10^2$ | — | $5.1 \times 10^2$ | $4.8 \times 10^2$ | $5.4 \times 10^2$ |
| Specific surface area | m²/g | 3.5 | 10.8 | — | 6.3 | 6.5 | 6.2 |

TABLE 2

|  |  | Example 4 | Example 5 | Example 6 | Reference Example 2 | Example 7 | Example 8 |
|---|---|---|---|---|---|---|---|
| Chain transfer agent(ethane) | g | 1.8 | 0.2 | 1.8 | 1.8 | 1.8 | 1.8 |
| Emulsion polymerization step | Stirring speed | rpm | 350 | 350 | 350 | 350 | 350 | 350 |
|  | Consumption of TFE | g | 50 | 105 | 315 | 315 | 175 | 490 |
|  | Compound added | — | — | — | — | — | APFHx | APFHx | APFHx |
|  | Amount | g | — | — | — | 0.56 | 0.56 | 0.56 |
| Suspension polymerization step | Stirring speed | rpm | 700 | 700 | 700 | — | 700 | 700 |
|  | Consumption of TFE | g | 650 | 595 | 385 | — | 575 | 210 |
|  | Compound added | — | Oxalic acid dihydrate | Oxalic acid dihydrate | Oxalic acid dihydrate | — | Oxalic acid dihydrate | Oxalic acid dihydrate |
|  | Amount | g | 3.4 | 3.4 | 3.4 | — | 3.4 | 3.4 |
| Concentration of solid in aqueous phase | wt % | 0.04 | 0.05 | 0.08 | 10.1 | 0.10 | 0.30 |
| Average primary particle size | nm | — | — | — | 165 | — | — |
| Average particle size | μm | 14.9 | 49.5 | 9.7 | — | 8.4 | 8.0 |
| D90 | μm | 34.8 | 106.9 | 35.5 | — | 30.4 | 29.6 |
| D10 | μm | 4.2 | 15.2 | 2.1 | — | 1.9 | 1.8 |
| D90/D10 | — | 8.3 | 7.0 | 16.7 | — | 16.1 | 16.1 |
| Percentage of particles 1 μm or less | % | 3.0 | 0.5 | 7.5 | — | 8.9 | 8.7 |
| Melting point | °C. | 326 | 328 | 326 | — | 326 | 326 |
| Melt viscosity | Pa·s | $5.5 \times 10^2$ | $8.1 \times 10^3$ | $4.2 \times 10^2$ | — | $5.0 \times 10^2$ | $3.5 \times 10^2$ |
| Specific surface area | m²/g | 5.2 | 5.7 | 6.7 | — | 6.3 | 7.0 |

Ground Comparative Example 1

The low-molecular weight PTFE powder obtained in Comparative Example 1 was made into a fine powder in a grinder. An air jet mill 200AFG (Hosokawa Micron) equipped with a classifier was used. The speed of the classifying rotor of the classifier was approximately 9000 rpm.

Ground Comparative Example 2

The low-molecular weight PTFE powder obtained in Comparative Example 2 was made into a fine powder in the same manner as Ground Comparative Example 1 at a classifier rotor speed of approximately 7000 rpm.

GROUND EXAMPLE 1

The low-molecular weight PTFE powder obtained in Example 3 was made into a fine powder in the same manner as Ground Comparative Example 1 at a classifier rotor speed of approximately 7000 rpm.

GROUND EXAMPLE 2

The low-molecular weight PTFE powder obtained in Example 8 was made into a fine powder in the same manner as Ground Comparative Example 1 at a classifier rotor speed of approximately 7000 rpm.

Table 3 shows the results for the ground powders.

TABLE 3

|  |  | Ground Comparative Example 1 | Ground Comparative Example 2 | Ground Example 1 | Ground Example 2 |
|---|---|---|---|---|---|
| Average particle size | μm | 3.6 | 2.6 | 3.1 | 2.9 |
| D90 | μm | 9.9 | 6.2 | 9.0 | 7.4 |
| D10 | μm | 0.8 | 0.8 | 0.7 | 0.7 |
| D90/D10 | — | 12.9 | 7.8 | 12.7 | 10.9 |

The dispersibility was evaluated in the low-molecular weight PTFE powders obtained from Comparative Examples 1 and 2, Example 3, Example 8, Ground Comparative Examples 1 and 2, and Ground Examples 1 and 2.

Dispersibility Evaluation

First 55 g of polyether sulfone were added to 336 g of N-methyl-2-pyrrolidone, and the liquid mixture was stirred with a dispersion-type stirrer until clear. Then 70 g of low-molecular weight PTFE powder were added, and mixed by stirring at a stirring speed of 3000 rpm.

At 15 minute intervals the liquid was applied to a blade, and the roughness of the blade was measured. If the blade roughness was 15 μm or less, then the dispersibility was given a passing score, and the total stirring time was recorded. If the blade roughness did not reach 15 μm or less after 120 min of total stirring time, the blade roughness at a total stirring time of 120 min was recorded.

The results of the dispersibility evaluation are shown in Tables 4 and 5.

The blade roughness with the coating material to which the low-molecular weight PTFE powders obtained in Comparative Example 2 and Examples 3 and 8 were added was lower than the blade roughness with the coating material to which the low-molecular weight PTFE powder obtained in Comparative Example 1 was added.

The blade roughness with the coating material obtained by adding the low-molecular weight PTFE powders obtained in Ground Examples 1 and 2 was no different from that with low-molecular weight PTFE powders obtained from Ground Comparative Examples 1 and 2, and the dispersibility in all cases was satisfactory. However, the time required for the roughness to reach 15 μm or less of the blade with the coating material added with the low-molecular weight PTFE powder obtained from Ground Comparative Example 2 was longer than those in Ground Comparative Example 1 and Ground Examples 1 and 2, so the dispersibility was poorer.

A coating evaluation was performed on the low-molecular weight PTFE powders obtained from Comparative Examples 1 and 2, Example 3, Example 8, Ground Comparative Examples 1 and 2, and Ground Examples 1 and 2.

Coating Evaluation

First, 42 g of polyether sulfone was added to a mixing solvent of 130 g of N-methyl-2-pyrrolidone, 24 g of xylene, and 72 g of methylisobutyl ketone, and the mixture was stirred until clear with a dispersion-type stirrer. Next 16.8 g of low-molecular weight PTFE powder was added and mixed by stirring for 30 min at a stirring speed of 3000 rpm. Then a carbon black paste prepared by stirring together 1.2 g of carbon black and 14 g of N-methyl-2-pyrrolidone was added to the above low-molecular weight PTFE liquid dispersion, and stirred for 10 min at a stirring speed of 3000 rpm to prepare a coating material.

The above coating material was sprayed onto a degreased aluminum plate, dried for 15 min at 90° C., and then baked for 15 min at 380° C. to prepare a coated plate.

The following evaluation tests were performed on the coating material and coated plate.

(1) Coating Material Viscosity

The coating material viscosity was measured in accordance with JIS K 6893.

(2) Glossiness

Glossiness (60°) was measured in accordance with JIS K 5400.

(3) Resistance to Surface Abrasion

In accordance with ASTM D-1044, the wear was measured after 1000 cycles with a 1.0 kg load using abrasive material CS-17.

(4) Coating Film Appearance

The appearance of the coating film was observed visually.

The results of the coating evaluations are shown in Tables 4 and 5.

TABLE 4

| Low-molecular weight PTFE added | | Comparative Example 1 | Comparative Example 2 | Example 3 | Example 8 |
|---|---|---|---|---|---|
| [Dispersibility Evaluation] | | | | | |
| Stirring time | min. | 120 | 120 | 120 | 120 |
| Blade roughness | μm | 25 | 20 | 20 | 20 |

| [Coating test] | | Coating Comparative Example 1 | Coating Comparative Example 2 | Coating Example 1 | Coating Example 2 |
|---|---|---|---|---|---|
| Coating Material Viscosity | cP, at 25° C. | 105 | 280 | 172 | 182 |
| Glossiness | — | 20 | 34 | 24 | 25 |
| Level of surface abrasion | mg | 33.5 | 22.8 | 26.5 | 24.5 |
| Coating Film Appearance | — | Very rough Floating of white contaminants | Rough | Rough | Rough |

TABLE 5

| Low-molecular weight PTFE added | | Ground Comparative Example 1 | Ground Example 1 | Ground Example 2 | Ground Comparative Example 2 |
|---|---|---|---|---|---|
| [Dispersibility Evaluation] | | | | | |
| Stirring time | min. | 15 | 15 | 15 | 60 |
| Blade roughness | μm | 5 or less | 5 or less | 5 or less | 5 or less |
| [Coating test] | | Coating Comparative Example 3 | Coating Example 3 | Coating Example 4 | Coating Comparative Example 5 |
| Coating Material Viscosity | cP, at 25° C. | 155 | 207 | 220 | 300 |
| Glossiness | — | 37 | 35 | 33 | 40 |
| Level of surface abrasion | mg | 20.0 | 19.5 | 21.0 | 22.0 |
| Coating Film Appearance | — | Smooth | Smooth | Smooth | Smooth |

The appearance of the coating film to which the low-molecular weight PTFE powder obtained in Comparative Example 1 had been added was rougher than films with the low-molecular weight PTFE powders obtained in Comparative Example 2, and Examples 3 and 8.

The appearance of the coating film from the coating materials to which the low-molecular PTFE powders obtained from Ground Comparative Examples 1 and 2, and Ground Examples 1 and 2 had been added all had satisfactory smoothness, and the appearance of the coating film from the coating materials to which the low-molecular weight PTFE powders obtained in Ground Comparative Example 2, and Ground Examples 1 and 2 had been added were particularly smooth and had a satisfactory texture.

The coating material to which the low-molecular weight PTFE powder obtained from Comparative Example 1 had been added had lower viscosity than the films of Comparative Example 2, and Examples 3 and 8, and dripping occurred during application. On the other hand, the coating material to which the low-molecular weight PTFE powder obtained from Comparative Example 2 was added had high viscosity, and the handling properties were poor.

In addition, the coating material to which the low-molecular weight PTFE powder obtained from Ground Comparative Example 1 had been added had lower viscosity than the coating materials to which the low-molecular weight PTFE powders obtained from Ground Examples 1 and 2 were added, and dripping was likely to occur, and the coating material to which the low-molecular weight PTFE powder obtained from Ground Comparative Example 2 was added had high viscosity, and the handling properties were poor.

INDUSTRIAL APPLICABILITY

Because the low-molecular weight PTFE powder of the present invention has the configuration disclosed above, it can be suitably used as an additive for a coating material, grease, cosmetic, etching solution, toner, plastic, and the like.

The invention claimed is:

1. A process for producing a low-molecular weight polytetrafluoroethylene powder,
the process comprising:
an emulsion polymerization step of polymerizing at least tetrafluoroethylene in the presence of a polymerization initiator and an aqueous medium to produce emulsified particles thereof;
an agglomeration step of agglomerating the emulsified particles to form an agglomerated powder thereof; and
a suspension polymerization step of polymerizing at least tetrafluoroethylene in the presence of the agglomerated powder, a polymerization initiator, and an aqueous medium,
wherein the emulsion polymerization step and the suspension polymerization step are carried out continuously.

2. The process for producing a low-molecular weight polytetrafluoroethylene powder according to claim 1, wherein a chain transfer agent is present in at least one of the emulsion polymerization step and the suspension polymerization step.

3. The process for producing a low-molecular weight polytetrafluoroethylene powder according claim 1, wherein the polymerization initiator is a water-soluble peroxide.

4. The process for producing a low-molecular weight polytetrafluoroethylene powder according to claim 1, wherein the emulsion polymerization step is a step in which polymerization is carried out in the presence of a surfactant.

5. The process for producing a low-molecular weight polytetrafluoroethylene powder according to claim 4, wherein the surfactant is a fluorine-containing surfactant.

6. The process for producing a low-molecular weight polytetrafluoroethylene powder according to claim 4, wherein the surfactant is a hydrocarbon surfactant.

7. The process for producing a low-molecular weight polytetrafluoroethylene powder according to claim 1, wherein the agglomeration step is a step in which an electrolyte is added to agglomerate emulsified particles.

8. The process for producing a low-molecular weight polytetrafluoroethylene powder according to claim 7, wherein the electrolyte is at least one type of compound selected from a group consisting of ammonium carbonate, ammonium bicarbonate, sodium hydroxide, and ammonium sulfate.

9. The process for producing a low-molecular weight polytetrafluoroethylene powder according to claim 1, wherein the agglomeration step is a step in which an acid is added to agglomerate emulsified particles.

10. The process for producing a low-molecular weight polytetrafluoroethylene powder according to claim 9, wherein the acid is at least one type of compound selected from a group consisting of nitric acid, sulfuric acid, and oxalic acid.

11. The process for producing a low-molecular weight polytetrafluoroethylene powder according to claim 2, wherein the chain transfer agent is ethane or propane.

12. The process for producing a low-molecular weight polytetrafluoroethylene powder according to claim 3, wherein the water-soluble peroxide is at least one type of compound selected from a group consisting of ammonium persulfate, potassium persulfate, and disuccinic acid peroxide.

13. The process for producing a low-molecular weight polytetrafluoroethylene powder according to claim 1, further comprising a grinding step of grounding the low-molecular weight polytetrafluoroethylene powder.

14. A low-molecular weight polytetrafluoroethylene powder obtained from the production process according to claim 1, wherein the low-molecular weight polytetrafluoroethylene powder satisfies a specific surface area of 5 to 8 m²/g, and contains particles having a particle size of 1 μm or less.

15. The low-molecular weight polytetrafluoroethylene powder according to claim 14, wherein the low-molecular weight polytetrafluoroethylene powder satisfies a melt viscosity of 700,000 Pa·s or less.

16. The low-molecular weight polytetrafluoroethylene powder according to claim 14, wherein the low-molecular weight polytetrafluoroethylene powder satisfies an average particle size of 0.5 to 30 μm.

17. The process for producing a low-molecular weight polytetrafluoroethylene powder according to claim 1,
wherein, while the emulsion polymerization step is progressing, the suspension polymerization step begins during or after forced agglomeration of the emulsified particles by adding an electrolyte or an acid to the aqueous medium, and/or making the stifling rate faster than in the emulsion polymerization step.

18. The process for producing a low-molecular weight polytetrafluoroethylene powder according to claim 1,
the process further comprising:
a loading step of loading the aqueous medium and at least tetrafluoroethylene into a reaction vessel;
a polymerization initiation step of adding the polymerization initiator to initiate polymerization; and
wherein the suspension polymerization step of polymerizing at least tetrafluoroethylene is carried out during or after the agglomeration step in the presence of the agglomerated powder, polymerization initiator, and aqueous medium; and
a collection step of collecting low-molecular weight polytetrafluoroethylene powder from the reaction vessel.

* * * * *